(12) United States Patent
Lazarus et al.

(10) Patent No.: US 11,364,566 B2
(45) Date of Patent: Jun. 21, 2022

(54) COMPLEX LASER FOLDING AND FABRICATION

(71) Applicant: U.S. Army Research Laboratory, Adelphi, MD (US)

(72) Inventors: Nathan S. Lazarus, North Bethesda, MD (US); Gabriel L. Smith, Ellicott City, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 609 days.

(21) Appl. No.: 16/059,591

(22) Filed: Aug. 9, 2018

(65) Prior Publication Data
US 2020/0047281 A1 Feb. 13, 2020

(51) Int. Cl.
*B23K 26/00* (2014.01)
*B23K 26/06* (2014.01)
(Continued)

(52) U.S. Cl.
CPC ........ *B23K 26/0093* (2013.01); *B21D 11/203* (2013.01); *B21D 11/22* (2013.01);
(Continued)

(58) Field of Classification Search
CPC ...... B21D 5/008; B21D 11/203; B21D 37/16; B21D 11/22; B23K 26/38; B23K 26/009;
(Continued)

(56) References Cited

U.S. PATENT DOCUMENTS

| 5,228,324 A | 7/1993 | Frackiewicz et al. |
| 5,359,872 A | 11/1994 | Nachiki |

(Continued)

FOREIGN PATENT DOCUMENTS

| CN | 100398249 C | 7/2008 |
| DE | 10040978 A1 | 3/2002 |

OTHER PUBLICATIONS

T.R. Anderson et al., "Scalable, ambient atmosphere roll-to-roll manufacture of encapsulated large area, flexible organic tandem solar cell modules", Energy & Environmental Science, vol. 7, No. 9, Sep. 2014, pp. 2925-2933.

(Continued)

*Primary Examiner* — Dana Ross
*Assistant Examiner* — Kuangyue Chen
(74) *Attorney, Agent, or Firm* — Eric B. Compton

(57) ABSTRACT

Provided, among other things, is a method of cutting and folding a planar substrate with a focused laser beam, directed from above the substrate, to form a shape with features in 3-dimensions, the method comprising: (a) executing from above laser cuts to the planar substrate so as to provide one or more a releasable segments; (b) executing from above one or more laser-executed upward folds to bend all or a portion of a releasable segment; and (c) executing from above one or more laser-executed downward folds to bend all or a portion of a releasable segment; wherein the cuts and folds are structured so that precursors to the 3D shape remain attached to the substrate while sufficient cuts and folds are made to form the 3D shape, and wherein the planar substrate is immobile during said steps (a) through (c), or is only moved in the plane of the substrate.

24 Claims, 13 Drawing Sheets

(51) Int. Cl.
    *B21D 11/20* (2006.01)
    *B21D 11/22* (2006.01)
(52) U.S. Cl.
    CPC ........ *B23K 26/009* (2013.01); *B23K 26/0643* (2013.01); *B23K 26/0648* (2013.01)
(58) Field of Classification Search
    CPC .... B23K 26/08; B23K 26/40; B23K 26/0643; B23K 26/0846; B23K 2103/26; B23K 26/0622; B23K 26/0648; B23K 26/354; B23K 2101/16; B23K 2103/12; B23K 2103/05; B23K 26/0093; B23K 26/0006
    See application file for complete search history.

(56) References Cited

U.S. PATENT DOCUMENTS

| | | | |
|---|---|---|---|
| 5,712,463 | A | 1/1998 | Singh et al. |
| 5,719,374 | A | 2/1998 | Frackiewicz et al. |
| 6,011,239 | A | 1/2000 | Singh et al. |
| 6,251,328 | B1 | 6/2001 | Beyer et al. |
| 6,415,639 | B1 | 7/2002 | Kilian et al. |
| 6,622,540 | B2 | 9/2003 | Jones et al. |
| 6,640,604 | B2 | 11/2003 | Matsushita |
| 6,933,098 | B2 | 8/2005 | Chan-Park et al. |
| 7,005,468 | B2 | 2/2006 | Zang et al. |
| 7,476,557 | B2 | 1/2009 | Daniels et al. |
| 8,113,248 | B2 | 2/2012 | Lee et al. |
| 8,192,545 | B2 | 6/2012 | Hiura et al. |
| 8,435,373 | B2 | 5/2013 | Slafer |
| 8,601,680 | B2 | 12/2013 | Choi et al. |
| 8,828,116 | B2 | 9/2014 | Fuwa |
| 8,980,380 | B2 | 3/2015 | Pique et al. |
| 9,199,292 | B2 | 12/2015 | Wunsch |
| 9,272,426 | B2 | 3/2016 | Morris et al. |
| 10,342,119 | B1* | 7/2019 | Mujcinovic ............ H05K 5/069 |
| 2002/0021480 | A1* | 2/2002 | Auracher ............... G02B 7/023 |
| | | | 359/244 |
| 2002/0184936 | A1 | 12/2002 | Gitlin |
| 2016/0016255 | A1* | 1/2016 | Bruck ...................... B21D 3/14 |
| | | | 219/76.14 |
| 2016/0046132 | A1* | 2/2016 | Tokushima ............ B23K 26/38 |
| | | | 347/225 |
| 2018/0222604 | A1 | 8/2018 | Garus |
| 2019/0188346 | A1* | 6/2019 | Mirabella ............... G06F 30/20 |

OTHER PUBLICATIONS

A. Gisario et al., "LaserOrigami (LO) of three-dimensional (3D) components: Experimental analysis and numerical modelling", Journal of Manufacturing Processes, 23, 2016, pp. 242-248.

K. Jain et al., "Flexible Electronics and Displays: High-Resolution, Roll-to-Roll, Projection Lithography and Photoablation Processing Technologies for High-Throughput Production", Proceedings of the IEEE, vol. 93, No. 8, Aug. 2005, pp. 1500-1510.

J. Magee et al., "Process planning for laser-assisted forming", Journal of Material Processing Technology, 120, 2002, pp. 322-326.

J. Dutta Majumdar et al., "Laser material processing", International Materials Reviews, 56:5-6, 2011, pp. 341-388, DOI: 10.1179/1743280411Y.0000000003.

M. Nunobiki et al., "Bending of Pure Titanium Sheet to Curved Surface Shape by Laser Forming Technique", Advanced Materials Research, ISSN: 1662-8985, vols. 126-128, 2010, pp. 388-393.

G. Thomson et al., "Controlled laser forming for rapid prototyping", Rapid Prototyping Journal, vol. 3, Iss, pp. 137-143.

J. Yeo et al., "Flexible supercapacitor fabrication by room temperature rapid laser processing of roll-to-roll printed metal nanoparticle ink for wearable electronics application", Journal of Power Sources, 246, 2014, pp. 562-568.

R. Sondergaard et al., "Roll-to-roll fabrication of polymer solar cells", Materialstoday, vol. 15, No. 1-2, Jan.-Feb. 2012, pp. 36-49.

N. Lazarus et al., "Laser Forming for Complex 3D Folding", Advanced Materials Technologies, 2017, 1700109, 6 pgs. (First published: Aug. 10, 2017), https://onlinelibrary.wiley.com/doi/abs/10.1002/admt.201700109.

N. Lazarus et al., "Contactless laser fabrication and propulsion of freely moving structures", Extreme Mechanics Letters 20, 2018, pp. 46-50.

Hong Shen et al., "Modelling of laser forming—An review," Computational Materials Science 46 (2009) 834-840.

Stuart Paul Edwardson, "A Study into the 2D and 3D Laser Forming of Metallic Components," (PhD Thesis), The University of Liverpool, Department of Engineering, Mar. 2004.

Non-Final Office Action issued for related U.S. Appl. No. 16/662,951 dated Jul. 9, 2021.

Final Office Action issued for related U.S. Appl. No. 16/662,951 dated Dec. 6, 2021.

* cited by examiner

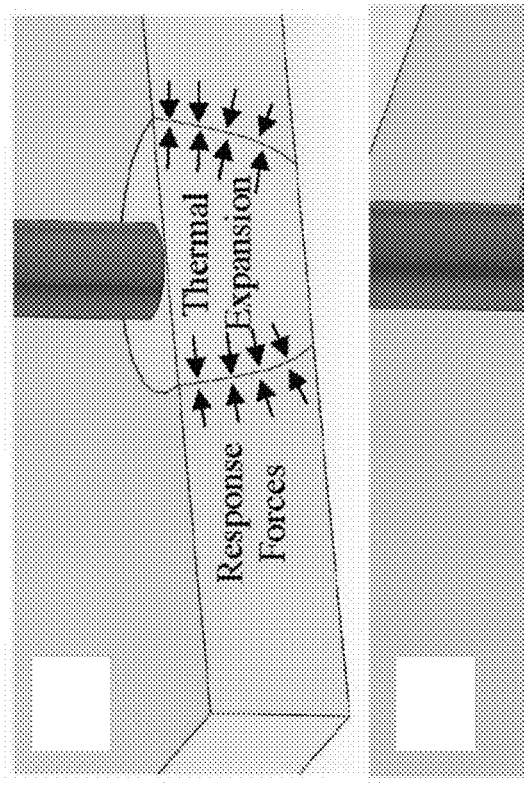
Fig. 1A
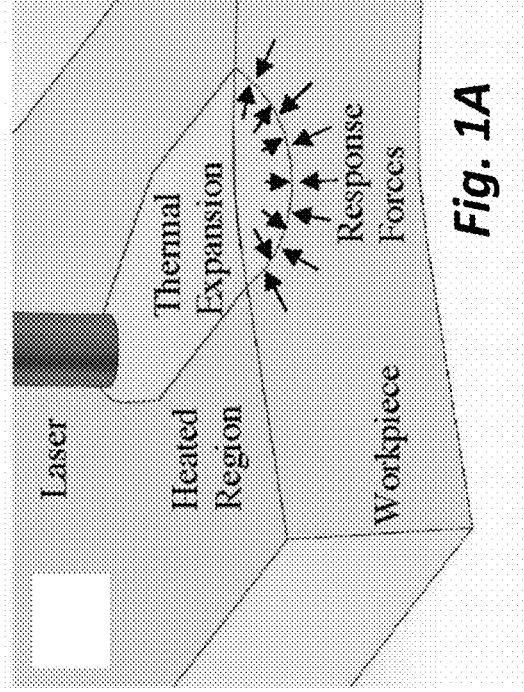
Fig. 1B
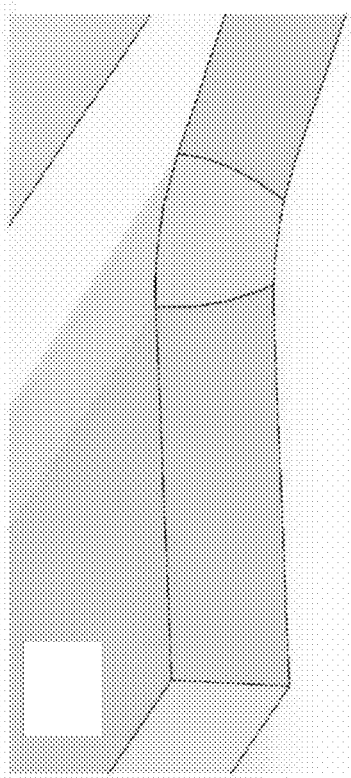
Fig. 1C
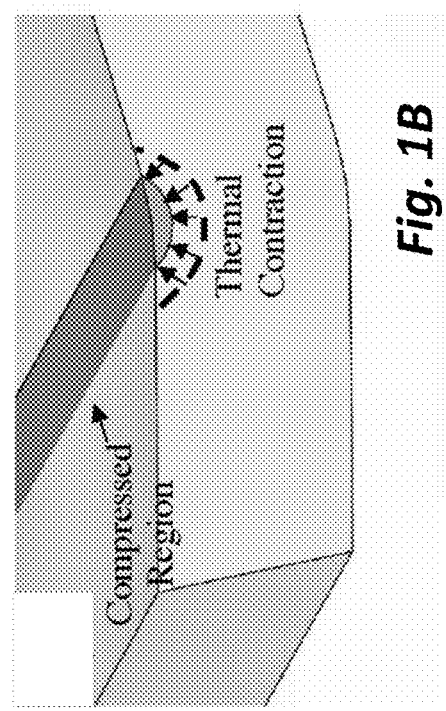
Fig. 1D
Fig. 1E

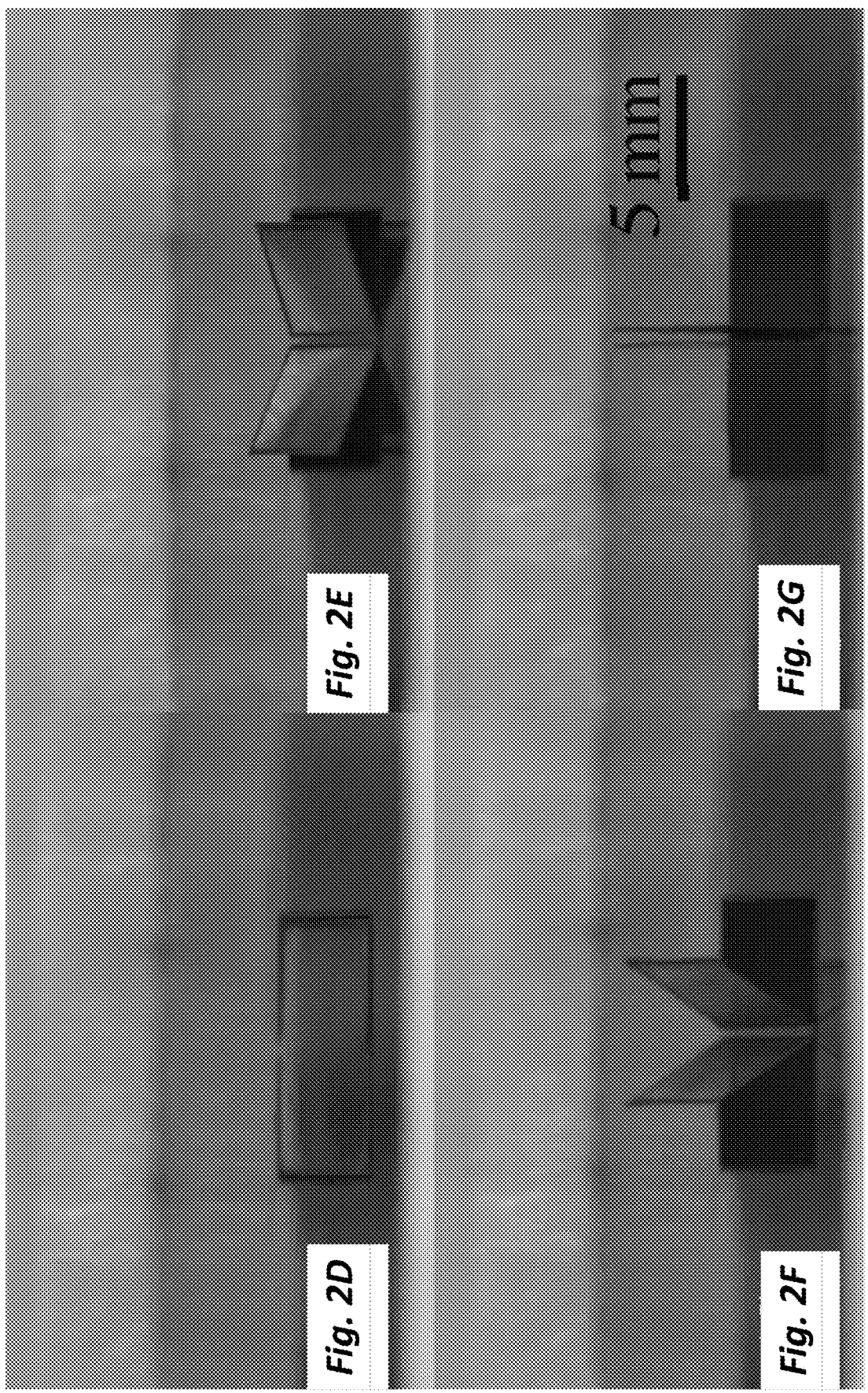

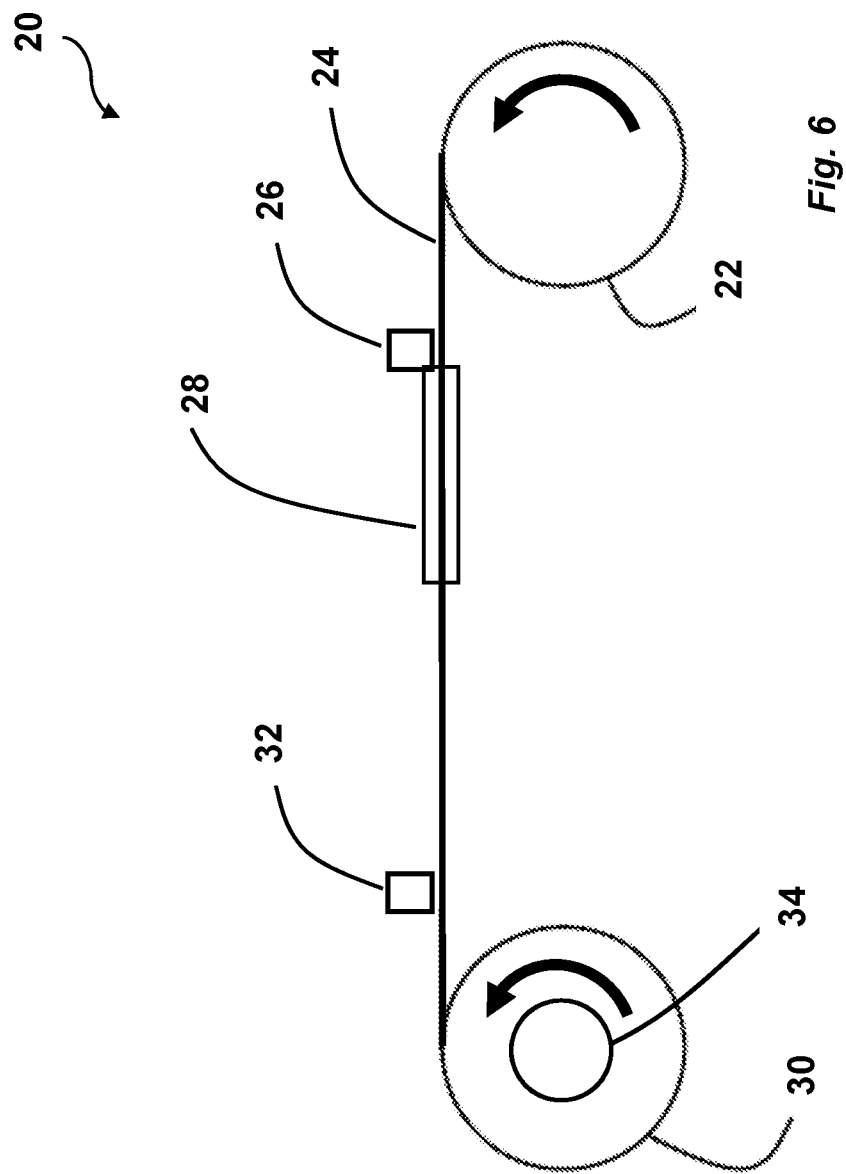

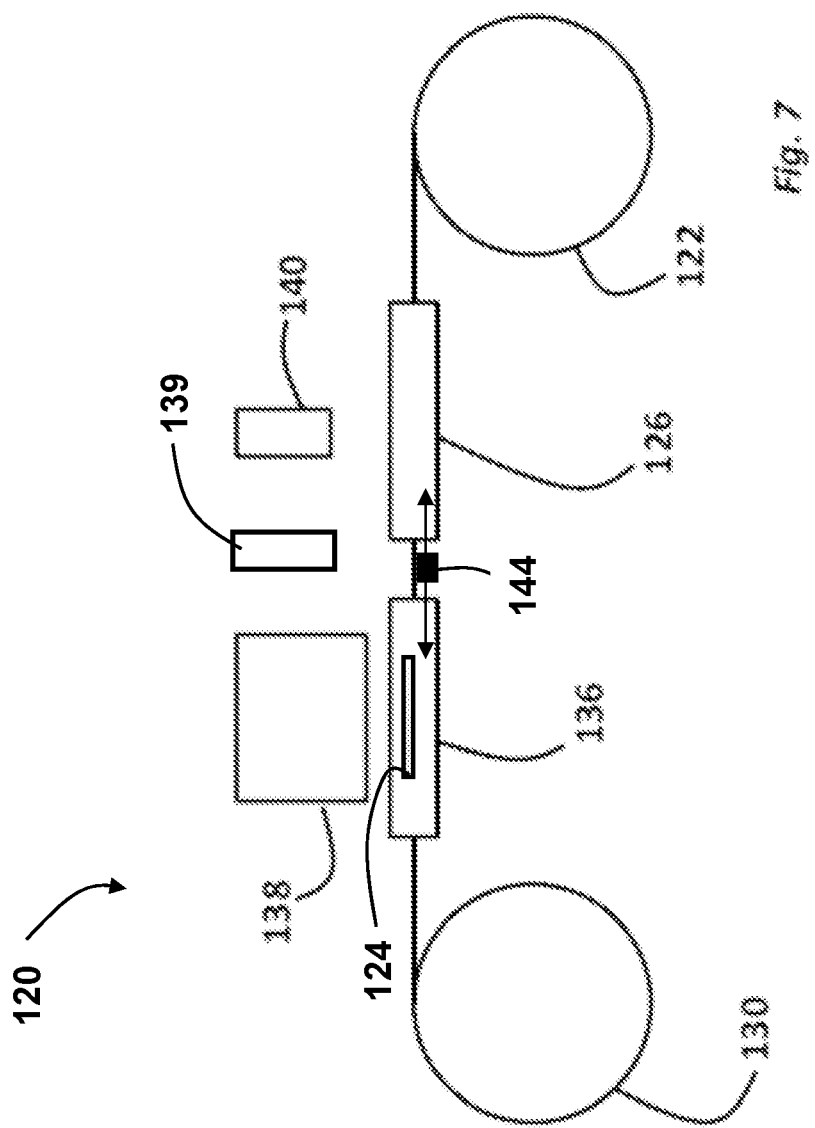

COMPLEX LASER FOLDING AND FABRICATION

GOVERNMENTAL INTEREST

The invention described herein may be manufactured, used and licensed by or for the U.S. Government.

FIELD

The present application relates generally to laser implemented methods and devices for manufacturing from substrates, such as cutting and shaping.

Aspects relating to this invention have been previously disclosed by the inventors in the following article: Nathan Lazarus and Gabriel L. Smith, "Laser Forming for Complex 3D Folding," Advanced Materials Technologies, 2017, 1700109, 6 pgs. (First published: 10 Aug. 2017). The article and supplemental supporting information are available online at: https://onlinelibrary.wiley.com/doi/abs/10.1002/admt.201700109. They are herein incorporated by reference in their entirety.

BACKGROUND

Many fabrication technologies are far easier in two dimensions, and some like spin-coating for photolithography are almost impossible in any other form. A great many of the products we buy, however, from the tools we use to the toys we give our children, are fundamentally 3D. One way to bridge this gap is to use origami-inspired principles to fold 2D sheets into 3D shapes. A wide range of devices have been demonstrated including printable robots, electrical devices such as antennas, and biomedical and optical systems, typically for applications such as space deployment where volume is highly constrained. To avoid folding by hand or other mechanical means, there is interest in self-folding, or folding through the use of an applied external stimulus such as light or heat. Patterning dark ink on plastic sheeting allows folding when exposed to unfocused light, multilayer composites can self-assemble in preprogrammed ways in an oven, and applying magnetic fields to embedded particles can create cubes and other structures. These types of approaches have also been demonstrated for a wide range of devices ranging down into the micro- and nano-scale.

Numerous techniques have been shown for self-folding, but with several limitations. Most research has focused on softer polymers that are more easily manipulated, and when other materials such as metals are included it is often as part of a composite or multilayer structure as in refs. Most demonstrations also require sample preparation elsewhere before self-folding, including cutting outlines or predefined regions, layer bonding or attachment inkjet or screen printing, or photolithography, and other cleanroom processes.

A technique known as laser forming is an interesting exception. In laser forming, a laser generates localized heating and cooling, introducing thermal stresses for a controlled bending moment or other deformation. Since the laser defines the heating area, there is no need for pre-patterning the target. Although not the only method possible for self-folding metal layers, it does have several important advantages. Unlike approaches based on ion implantation to generate plastic deformation in metal layers using specialized and highly expensive equipment such as a focused ion beam system, the current method can use lasers of low to moderate power levels that are comparatively cheap and commonly available. The ability to fine tune position in laser forming with repeated laser passes is a major advantage over surface-tension-driven self-folding based on actual melting through high energy plasma exposure, which also requires pre-patterning and highly specialized equipment. Although most commonly used for metals, with examples including nickel-titanium shape memory alloys, stainless steel, and copper in addition to the nickel used to illustrate the current invention, the folding technique has also been demonstrated for silicon and ceramics. Polymers can also be folded through laser-induced heating but folding in those cases typically results from heat-induced softening or strain relaxation at the glass transition temperature rather than the inelastic strains of laser forming. Example structures include saddle and ship hull shapes, cylinders, domes, and more complex features such as cubes.

SUMMARY

Here the inventors demonstrate using laser forming to go from a flat unpatterned sheet to final folded part, including cutting and both up and down folds, all without handling or removal from the tool. Although others have combined laser cutting and forming, to the inventors' knowledge they are the first to create complex multifold structures using laser cutting and forming without manually flipping the piece or using a positioning motor for rotation. We also provide the first demonstration of laser-forming-based alignment and interaction between components: folding a part in front of a positioned reflector surface, marking the part with the reflected laser and then moving it away. Using this system we demonstrate the marking of a surface originally on the underside of the sheet without moving the laser or holder. All parts in this work were demonstrated with a low cost (≈$10K), low power (20 W) marking laser, commercially obtained, without modification.

The inventors have also demonstrated that angles in excess of 90° can be laser folded either in the upward or downward direction relative to the laser.

The invention provides, among other things, is a method of cutting and folding a unpatterned substrate that defines a plane with a focused laser beam, directed from above the substrate, to form a shape with features in 3-dimensions, the method comprising: (a) executing from above laser cuts to the planar substrate so as to provide one or more releasable segments; (b) executing from above one or more laser-executed upward folds to bend at least one releasable segment; and (c) executing from above one or more laser-executed downward folds to bend all or a portion of a releasable segment; wherein the cuts and folds are structured so that precursors to the 3D shape remain attached to the substrate while sufficient cuts and folds are made to form the 3D shape, and wherein the planar substrate is immobile during said steps (a) through (c), or is only moved in the plane of the substrate.

DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only illustrative embodiments of this invention and are therefore not to be considered limiting of its scope, for the invention may admit to other equally effective embodiments.

FIG. 1A, FIG. 1B, FIG. 1C, FIG. 1D, and FIG. 1E show the operation of the TGM and BM mechanisms of folding;

FIG. 2D, FIG. 2E, FIG. 2F and FIG. 2G show images from TGM bending experiments;

FIG. 6 shows a reel-to-reel device; and

FIG. 7 shows another reel-to-reel device.

Figures 2A, 2B, 2C:
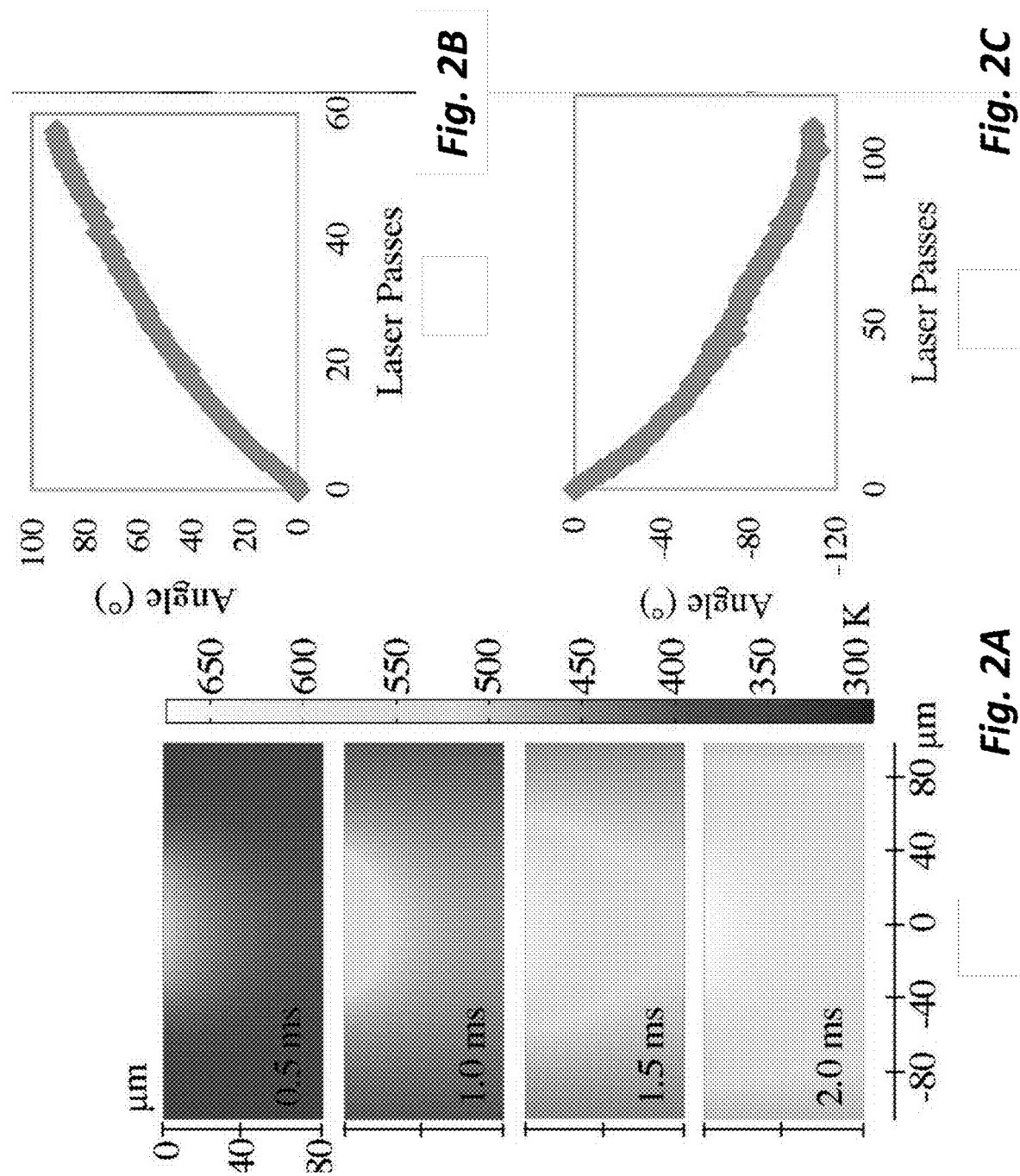
FIG. 2A shows thermal simulations.
FIGS. 2B and 2C show upward and downward bend angles with the number of laser passes.

To facilitate understanding, identical reference numerals have been used, where possible, to designate comparable elements that are common to the figures. The figures are not drawn to scale and may be simplified for clarity. It is contemplated that elements and features of one embodiment may be beneficially incorporated in other embodiments without further recitation.

DETAILED DESCRIPTION

In laser forming, a laser triggers rapid temperature changes and resulting thermal stresses in a workpiece, causing permanent plastic deformation. The folding here uses two types of laser forming known as the temperature gradient mechanism (TGM) and buckling mechanism (BM), respectively. For TGM-based forming, the laser is scanned rapidly to heat the surface while not allowing time for the heat to spread vertically through the workpiece. The surface expands while the rest of the piece does not, resulting in bending away from the laser, a phenomenon known as counterbending. However, the cooler surroundings act to constrain this expansion, resulting in the buildup of plastic compressive stresses (FIG. 1A). As the region cools, contraction occurs (FIG. 1B) and the shape bends back. The final contraction during cooling is the dominant effect, and therefore the final bending direction for TGM is always toward the laser beam.

Figure 5:
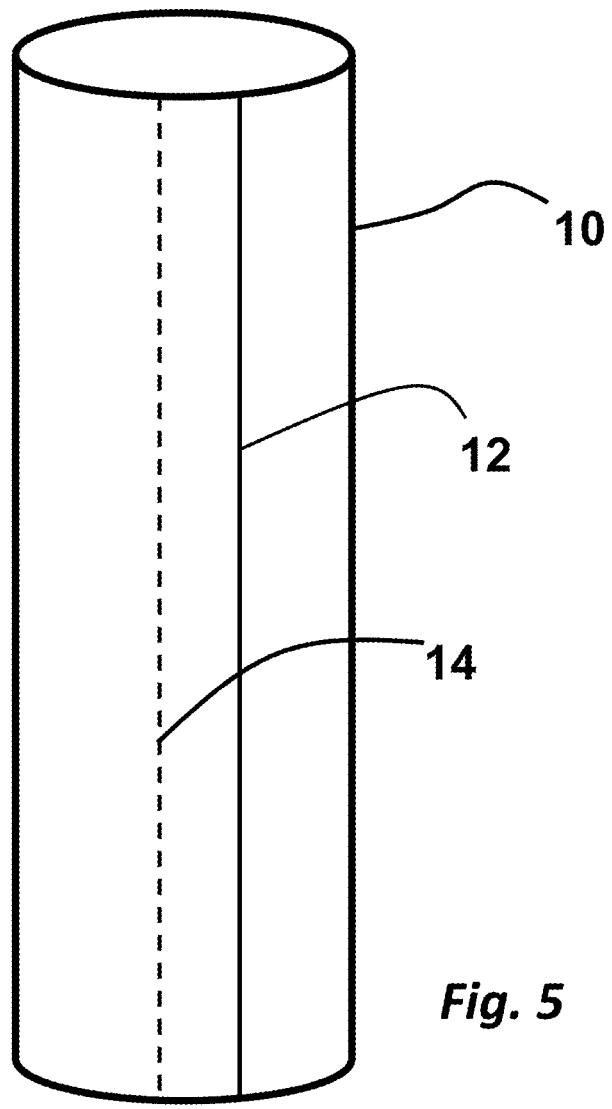
FIG. 5 shows an exemplary supply roll of substrate.

For the buckling mechanism, the laser is scanned more slowly so heat propagates through the thickness of the sheet resulting in a lateral temperature gradient (FIG. 1C). The heated region attempts to expand laterally but is again constrained, resulting in a buildup of compressive stresses. Once these stresses reach a threshold, an instability develops and the heated area buckles (FIG. 1D). As the laser travels across the fold, the buckle propagates across the surface resulting in bending, in the illustrated case away from the laser (FIG. 1E). In the absence of other constraints the laser exposed region is capable of buckling toward or away from the laser based on other factors such as orientation, residual stresses, or an applied force. Using a substrate that has been held in a roll, or otherwise conditioned to favor bending downward, and biasing it flat during the manufacturing process, assures that the BM bend is downward. Conditioning the substrate to bend in two dimensions, such as along axis x and along axis y (which can be orthogonal), increases the axes along which BM bends downwards. Two-dimensional biasing can be done by, for example, supplying the tape for a second roll by cutting a ribbon from a first roll at for example line 14 in the roll 10 (having seam 12) of FIG. 5. The ribbon can then be rolled lengthwise to create the second bias. Biasing the BM fold downwards can be done in a number of ways including prebending prior to clamping flat, applying an air stream, or using gravity to cause buckling downward.

Bending magnitude was measured for each mechanism by clamping 1.5 cm wide strips of metal shim stock into a holder and repeatedly scanning the laser at different travel speeds. The shim stock used was 80 μm thick high purity (99.99%) nickel foil. Nickel was chosen as a common engineering material. It also has a thermal conductivity low enough to easily transition between the two bending modes with the travel speeds possible for the laser tool used in the experiments. Nickel has a yield strain of between 0.5% and 1%, and is able to survive tens of percent plastic deformation before breakage. The exemplary laser was a commercial 20 W, 1064 nm wavelength solid state pulsed fiber marking laser (MC Series, Full Spectrum Laser) with measured spot size roughly 80 μm for the lens used (model SL-1064-112-163G, effective focal length 163 mm). This wavelength has a ≈10× smaller spot size than a 10 μm $CO_2$ laser and high absorbance into metals, 29% compared with 2% for the higher wavelength $CO_2$. High absorbance reduces needed power for a given thickness, reducing laser cost. For comparison, 500 W lasers of the same wavelength from the same manufacturer (Full Spectrum Laser) exceed $120,000 compared with roughly $10,000 for the 20 W laser here. For bending, the laser was kept at low power (5 W) to minimize material loss; full power (20 W) was used for cutting in later sections. No active cooling was used in these exemplary manufactures, and the primary mechanism of cooling was passive thermal conduction of heat through the nickel sheeting.

The nickel was obtained and stored in coil form on a 95 mm diameter spool, resulting in a radius of curvature that served as a natural prebend to allow directional control for the buckling mechanism. The characterization in the examples used a given material and thickness. However, the laser forming technique is however general, and has been demonstrated for metal sheeting as thick as 6 mm as well as in microelectromechanical systems (MEMS) structures as thin as a few tens of micrometers. Sub-micrometer levels of positional accuracy have been demonstrated using this technique, and laser forming has also been used commercially for microadjustment of contacts, relays, and drive actuators for hard disk drives. For more information on the effects of individual laser parameters on the bending phenomenon, the reader is encouraged to look for example to S. P. Edwardson, "A Study into the 2D and 3D Laser Forming of Metallic Components," (Ph.D. Thesis), University of Liverpool (United Kingdom), 2004, while H. Shen, F. Vollertsen, "Modelling of laser forming—An review," Comput. Mater. Sci. 2009, 46, 834 gives an insightful overview of the different analytical and numerical models of laser forming. (These references are incorporated herein by reference in their entirety.)

Thermal simulations in the numerical solver COMSOL 5.2 were performed to estimate the time scales necessary to transition between TGM and BM modes (FIG. 2A). Such thermal simulations can be used to determine parameters for other substrates and thicknesses. For nickel of the dimensions used here, by about 2 ms the heating has spread vertically through the test piece and begun to spread laterally. Experimentally, travel speeds of 30 mm s−1 were found to consistently trigger TGM bending (i.e., to always bend the workpiece upward), while 10 mm s−1 was found to consistently trigger BM bending (i.e., to bend upward or downward based on the direction of the prebend in the sheeting before clamping). Travel distances of the laser in 2 ms for the TGM and BM settings are 60 and 20 respectively. With known laser spot size of 80 this corresponds well with the estimated time scale from the simulation.

Side-view images were taken after individual passes in the experiments and an image processing tool (GIMP 2.8 (GNU Image Manipulation Program, gimp.org) was used to extract the bending angle (FIGS. 2B, 2C) for each mechanism, with estimated measurement accuracy about ±1°. Individual passes were spaced 15 s apart for cooling. For both mechanisms, the first few passes were found to give bending of roughly 2°, with the bend per pass dropping gradually with larger number of passes. This reduction is believed to result from the combined effects of strain hardening, section thickening, absorption variation, and geometrical changes. For the TGM bending (upward, toward the laser), the piece folding eventually blocks the laser, self-limiting the maximum to 90°, and the test was ended when the laser was visibly blocked. In embodiments where the laser angle (and possibly height) can be manipulated, greater angles can be achieved. Since the BM folding in this case moves away from the laser, the laser is never blocked and larger angles are possible. With this material, the maximum for BM folding was ≈110° before bending ceased, possibly due to the metal partially moving out from under the laser path. Again, with a laser that can be manipulated for angle of orientation, it is believed that greater bends can be achieved.

Figure 2H:
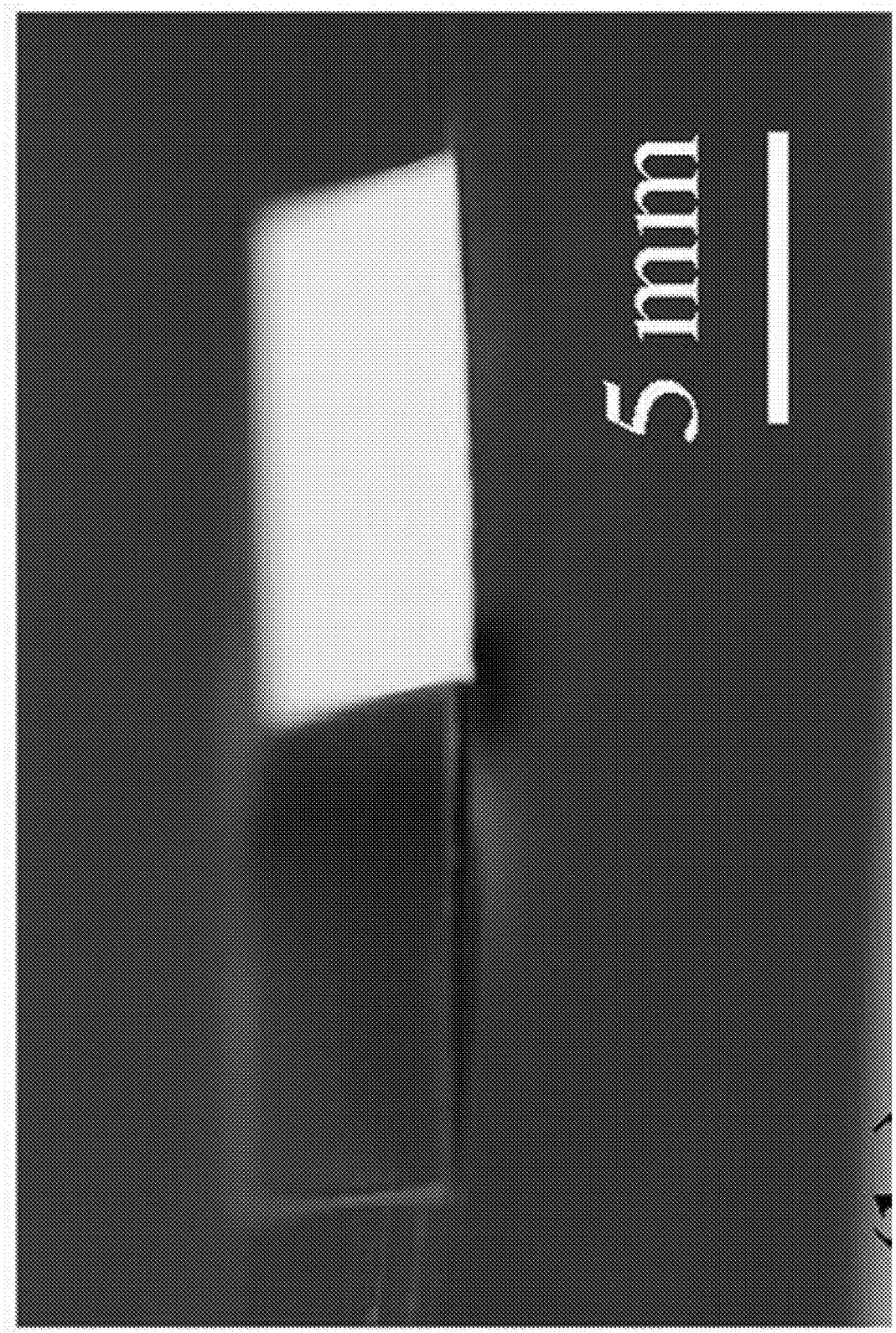
FIG. 2H shows an image from BM bending experiments.

Experiments were also performed toward a complete (180°) fold with each mechanism. Patterns were first cut using repeated passes by the laser at full power (20 W) and high speed (100 mm s−1), followed by laser induced bending. Although bending upward in the TGM mode blocks the laser, and therefore is limited to 90°, it is possible to make twofold in close proximity to make a V (FIGS. 2D-G), which can be folded almost into contact. The spacing shown is 400 µm; this distance sets the minimum spacing between the raised plates seen in the experiments. Unlike folds upward from TGM, downward bends do not block the laser, allowing complete 180° folds. FIG. 2H shows folding downward to almost flat on the underside (FIG. 2K). Since scanning repeatedly in the buckling mode along a single fold does not reach 180° as discussed previously, the complete fold here was obtained through a set of three folds 200 µm apart. It is believed that a complete fold can be achieved with two closely spaced folds.

Figure 3A:
FIG. 3A, FIG. 3B, FIG. 3C, FIG. 3D, FIG. 3E, and FIG. 3F show manufactures.
Figure 3B:
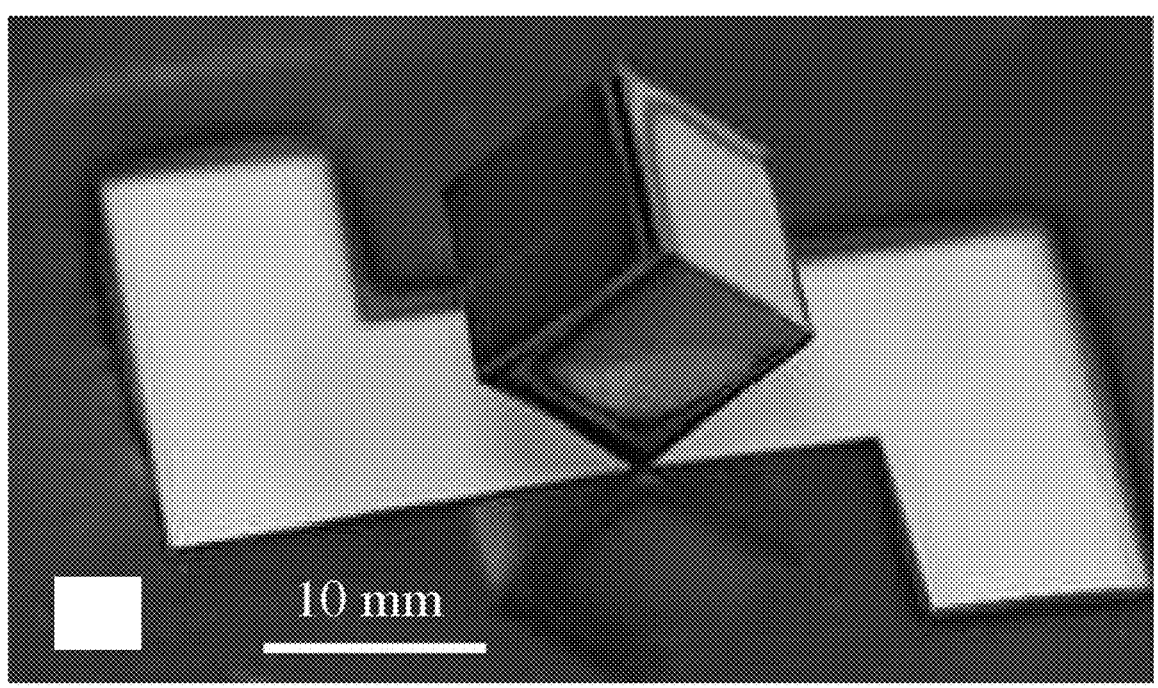

One of the advantages of using a commercial marking laser is the ease of rapidly prototyping a variety of self-assembled parts (FIGS. 3A to 3F). All pieces were cut and folded without manual handling. In FIG. 3A, a raised ARL logo was cut and folded. This demonstrates marking (etching a pattern on the surface at low power) and cutting at high power followed by a single TGM upward fold. Video S1, included with the Supporting Information at the aforementioned Advanced Materials Technologies article website, shows the part as it goes through each stage.

The same technique can be used for creating more complex parts such as cubes (FIG. 3B), which require a total of six upward folds. One of the main challenges for a completely enclosed structure is the need to avoid blocking the laser beam during folding. This was done by designing the order and position of the folds such that the final fold was exposed until the end of the process. This final fold, at the bottom of the cube, consisted of two 45° folds, 400 µm apart, similar to the V-fold depicted in FIG. 2F. By doing this final fold at an angle, the cube folds almost closed before the laser is blocked. There is also evident discoloration due to nickel oxidation at higher temperatures. This effect is not fundamental to the technique, and can be minimized by increasing the time delay between individual passes of the laser (to allow more time for cooling) or by plumbing in an inert atmosphere.

Figure 3C:
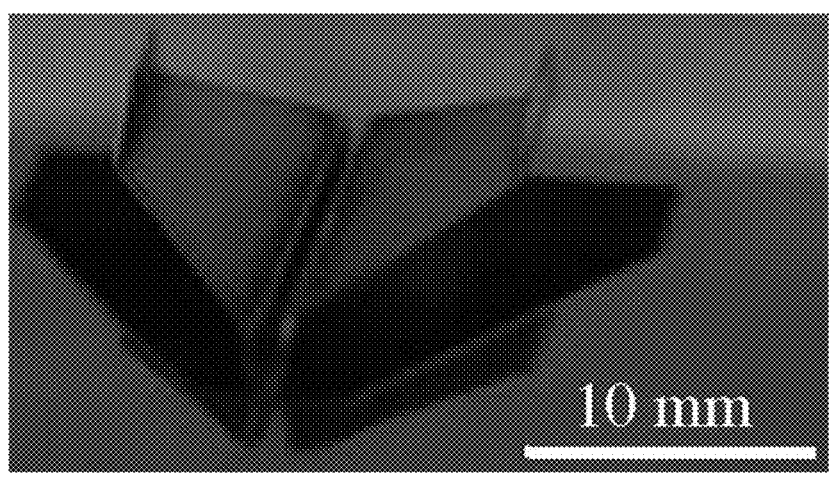

FIG. 3C shows a part made through a combination of upward and downward folds (temperature gradient and buckling folds, respectively). The "paper" airplane analog consists of six folds, with each individual wing folded using an initial upward fold (the tip) followed by a downward fold (the wing) and a final upward fold to create the plane body. In observing the folding process (Video S2, included with the Supporting Information at the aforementioned Advanced Materials Technologies article website), one of the challenges in folding parts back and forth across the plane of the original sheet becomes quickly evident. At several points one of the wings becomes pinned by the edges of the outline, requiring a few cycles for the part to break through. For parts of this size scale, this is only a minor issue mostly resulting in a delay in assembly.

Figure 3D:
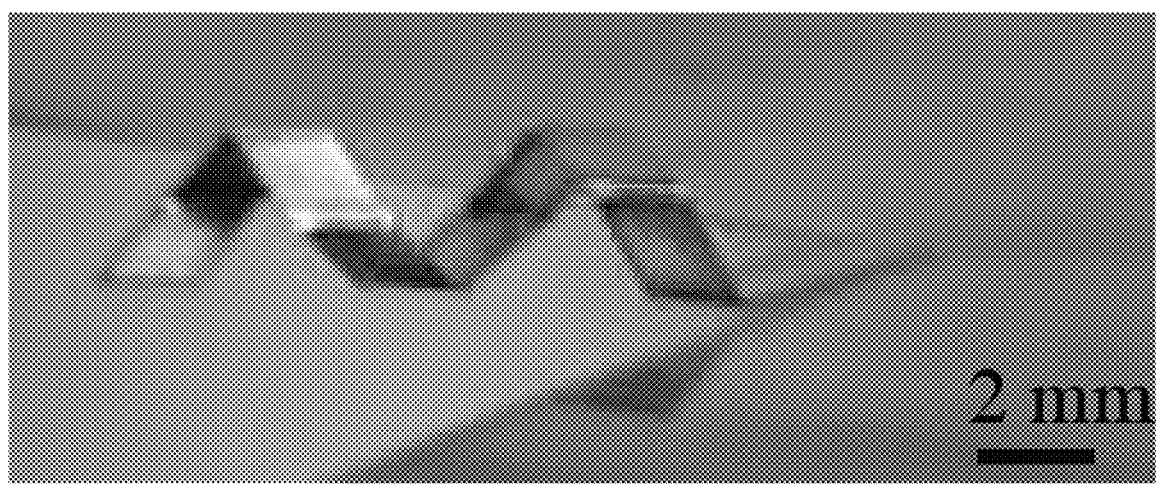
Figure 3E:
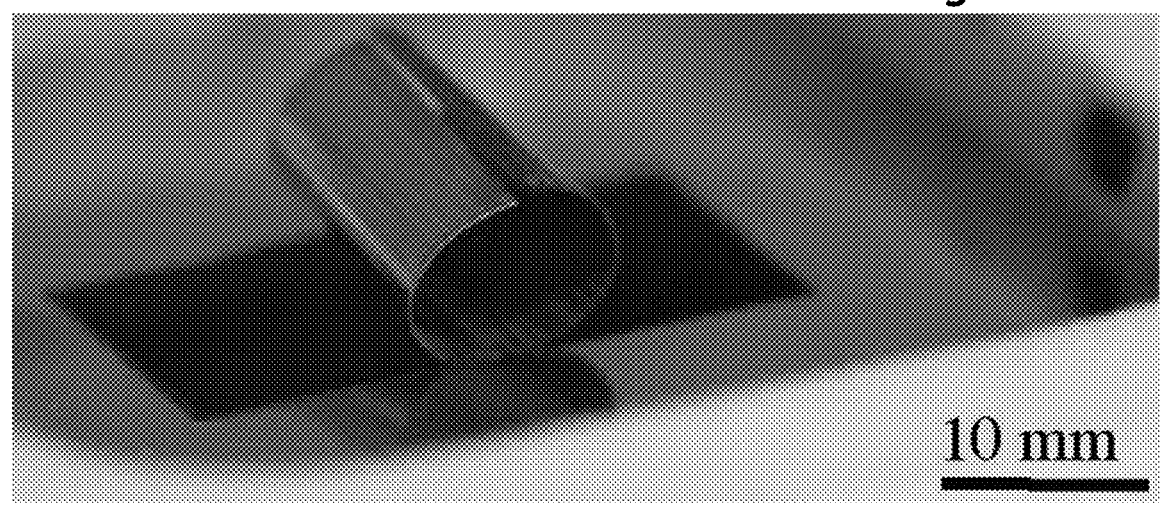
Figure 3F:
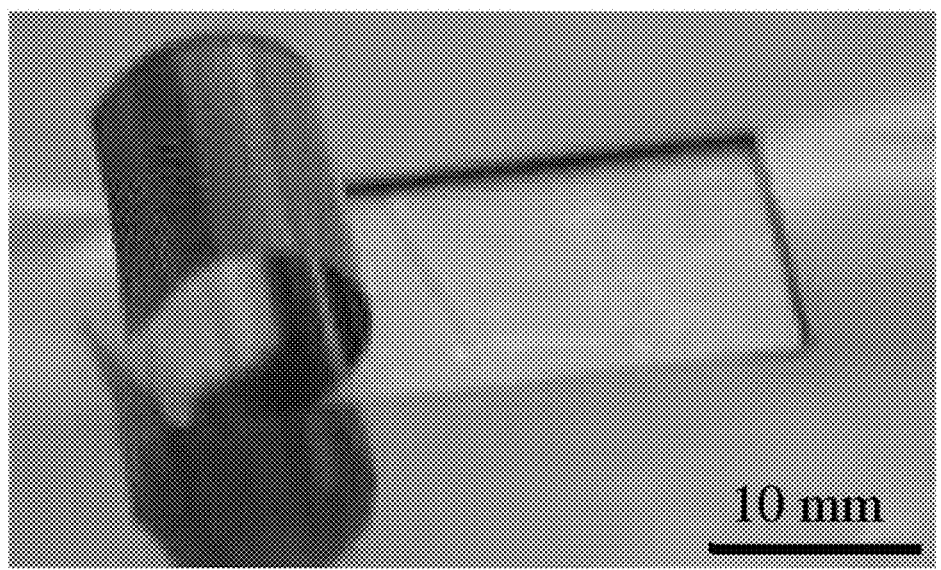

For smaller parts, however, building the force to break free is more difficult, requiring an alternative solution. One method investigated was to move the surrounding outline out of the way, allowing the assembled part to freely cross the exposed region. FIG. 3D shows a two-turn coil made using this approach; a large neighboring region is folded up out of plane, allowing the narrow nickel line to pass through the resulting hole in the sheet. The coil consists of eight distinct upward folds in addition to the fold moving the surroundings up. Nearly continuous bending is also possible using a series of tightly spaced folds, each a few degrees, to approximate a curved structure such as an arc or cylinder. See e.g., M. Nunobiki, K. Okuda, K. Hourai, H. Shizuka, "Bending of Pure Titanium Sheet to Curved Surface Shape by Laser Forming Technique," Adv. Mater. Res. 2010, 126, 388-393, herein incorporated by reference in its entirety. FIG. 3E shows a nearly complete cylinder consisting of two arcs bending upward to come together at a center fold. As with the cube, upward bending is limited by the eventual blocking of the laser; no such restriction is present for downward bending, allowing arcs greater than 180° using buckling (FIG. 3F).

The ability to precisely control angle and position using the marking laser also opens up the possibility of interaction between multiple parts, again without manual intervention. For demonstration, one specific challenge was attempted: testing whether it is possible to mark the underside of the metal sheet without flipping it over by hand. More specifically, a simple system was designed to fold a nickel flap up out of plane, move the surface originally on the underside in front of an optical reflector, use reflected laser light to pattern the surface, and then move the part away in preparation for further assembly.

Figures 4A, 4B:
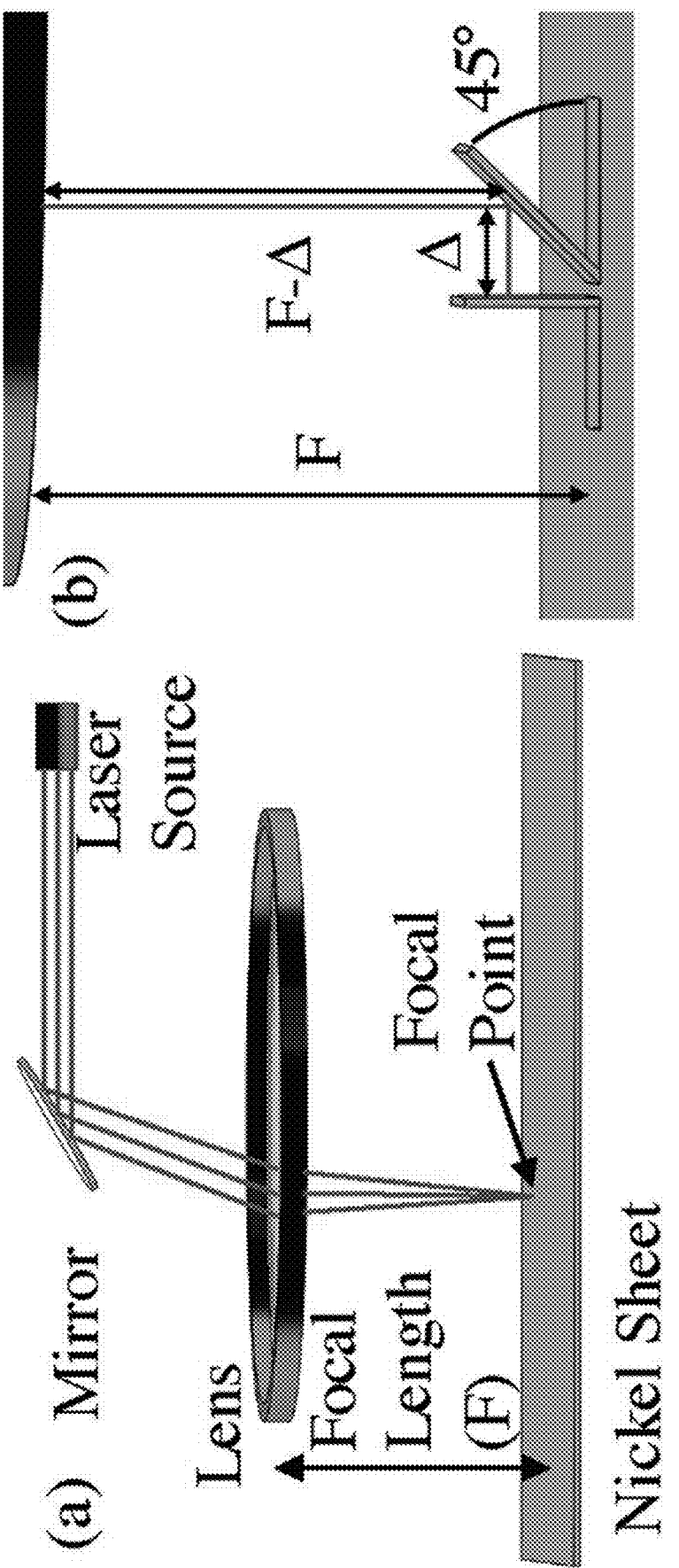
FIGS. 4A and 4B show the workings of a coordinated construct, in this case to provide an etching mirror.

FIG. 4A shows a simplified diagram of the workings of the marking laser. From a fixed source, the laser is reflected from mechanically positioned mirror, then through an F-theta lens, a lens incorporating designed distortion to maintain focus at a constant distance (163 mm from the lens for this laser) along a flat plane according to a simple positioning algorithm. Metal positioned above the plane of focus will not be hit by a focused laser, but rather by more dispersed light. If one folds a plate out of plane and then shine onto its surface, the laser will be too dispersed to cut, instead heating slightly and reflecting most of the light. Given the long distance from the lens (163 mm) and the small size of the target region (a nearly square region roughly 45 mm on a side, placed near the center of the marking laser cutting area), the beam can be considered almost normal to the cutting plane. Since the marking laser is designed to focus a known distance (the focal length F) from the lens, maintaining the same travel distance for the reflected light should similarly focus the laser. For a reflector at 45°, this distance will occur along a vertical plane at the reflector base (where the vertical distance F−Δ plus the lateral distance Δ sum to F, as in FIG. 4B).

Figure 4C:
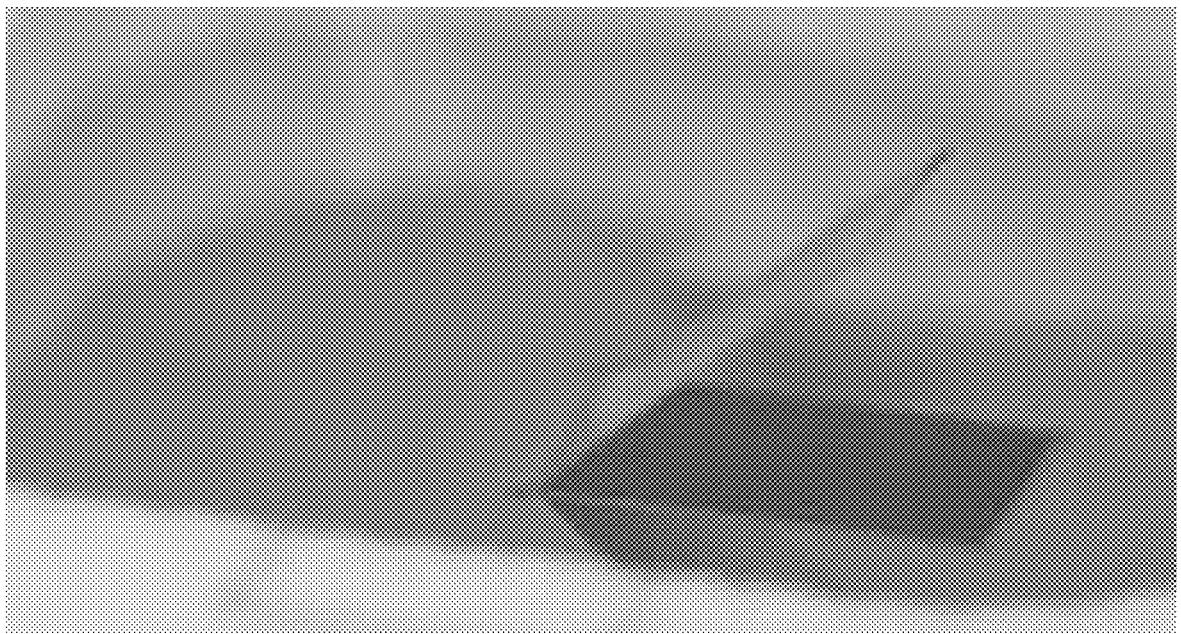
FIG. 4C, FIG. 4D, FIG. 4E, FIG. 4F and FIG. 4G show stages in an etching manufacture.
Figure 4D:
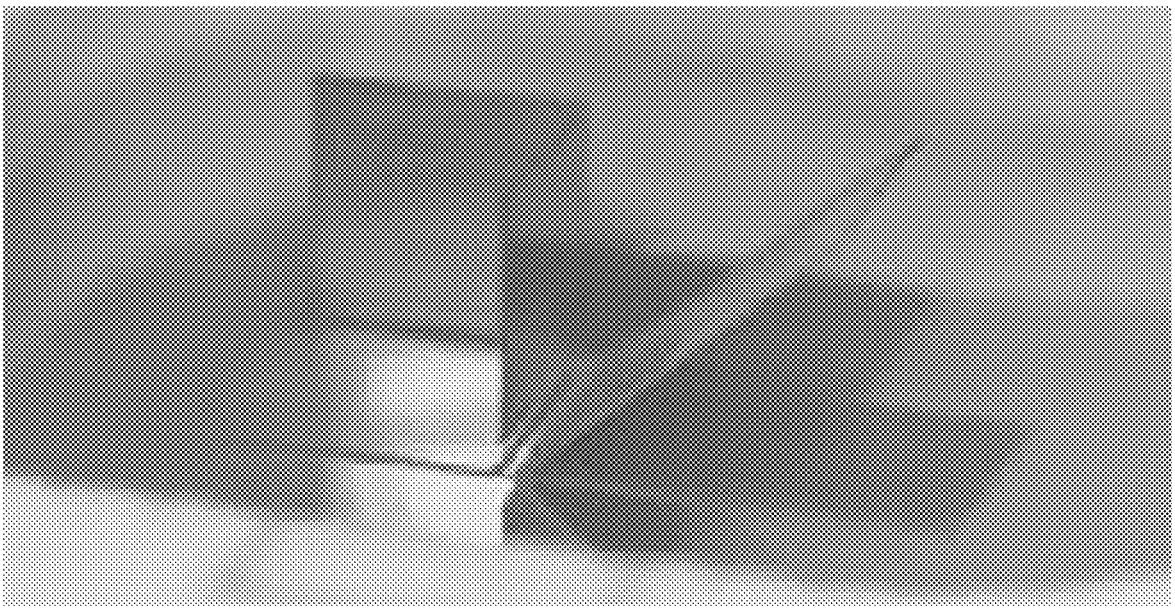
Figure 4E:
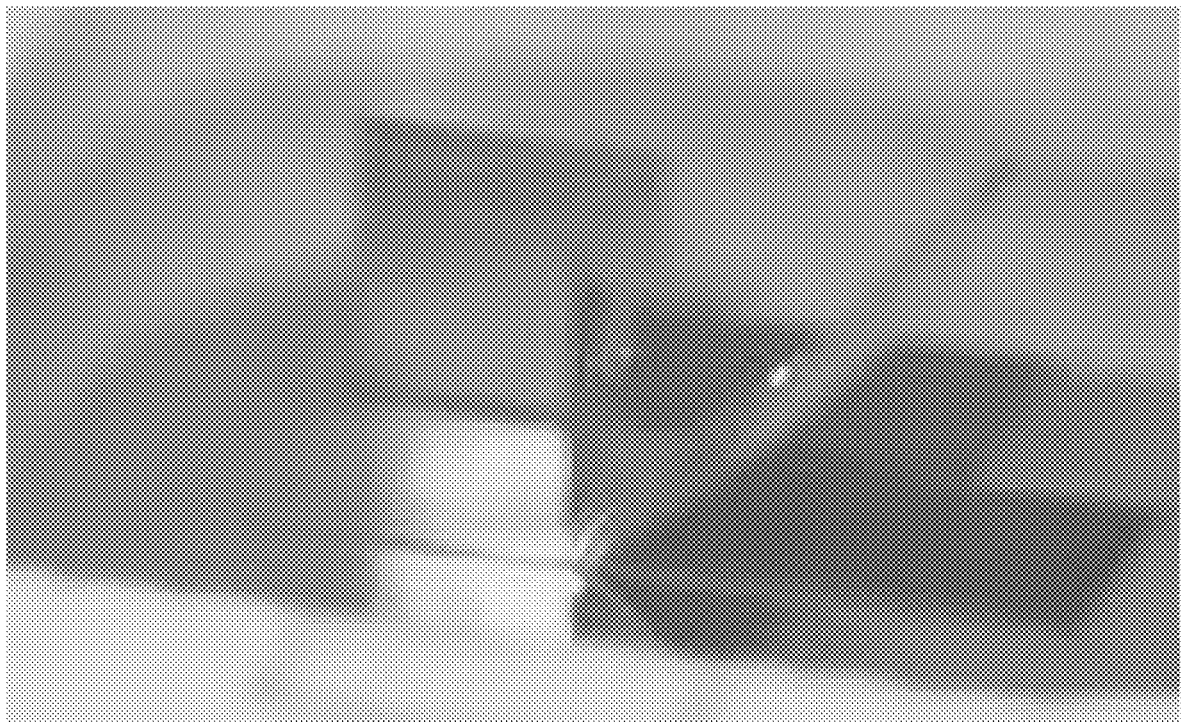
Figure 4F:
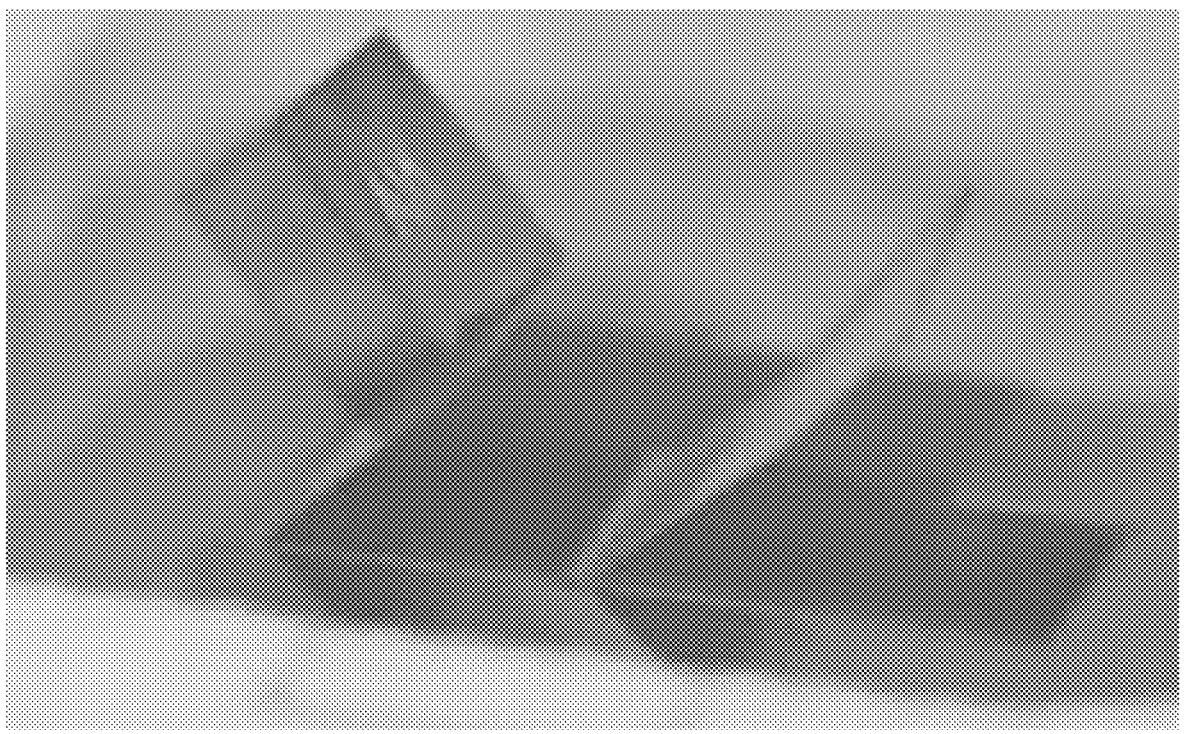
Figure 4G:
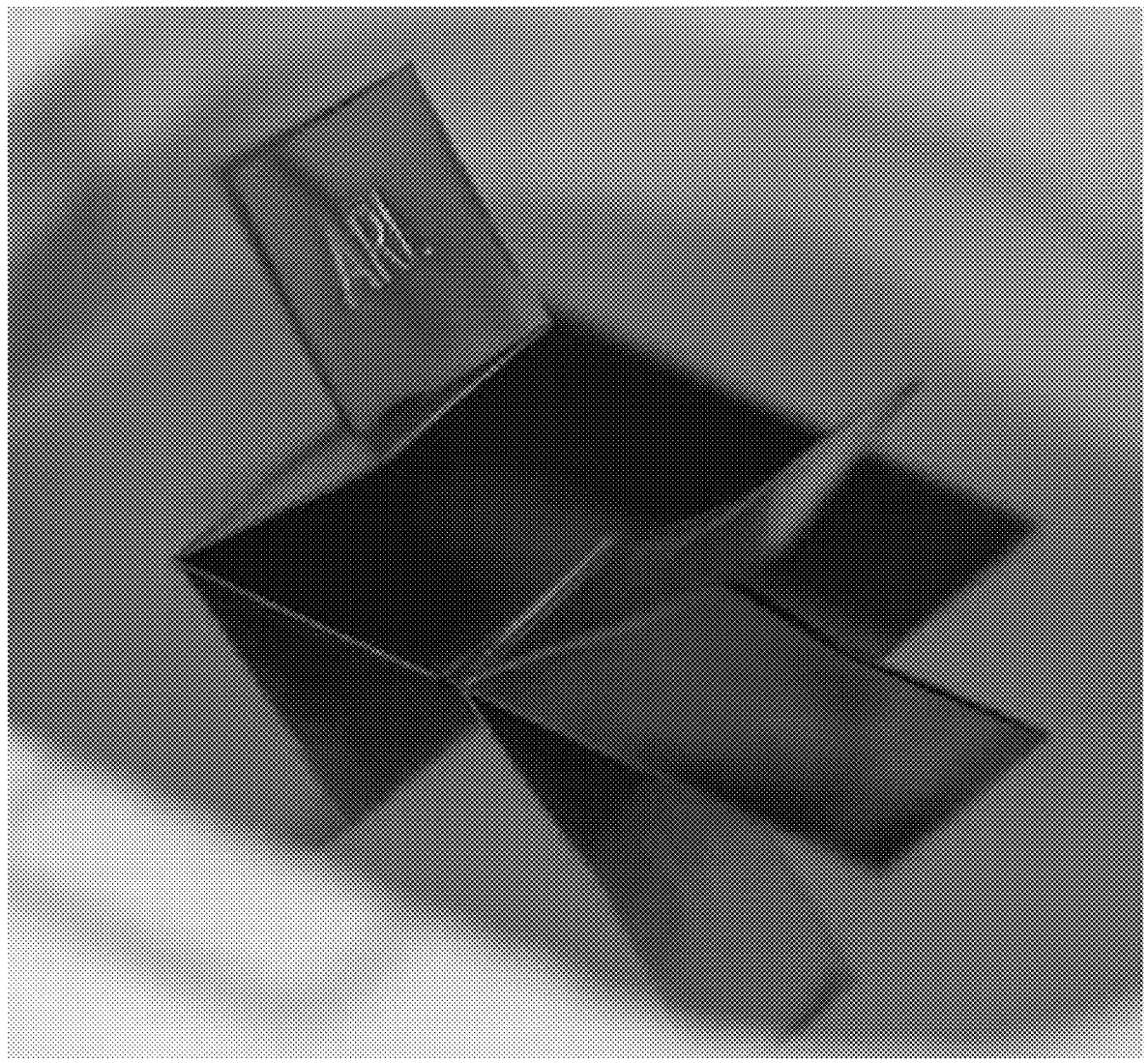

FIGS. 4C to 4F shows marking using this technique. First, a reflector was cut and folded out of plane to ≈45° (FIG. 4C). A nearby region was cut and then folded vertical using one fold, followed by a second fold to rotate it sideways to align along the reflector base (FIG. 4D). These folds were designed to match the first stages of a cube similar to that in FIG. 3B. Note the face now positioned in front of the reflector was originally on the underside of the sheeting. The letters "ARL" were then scanned on the reflector (and reflected onto the side of the cube) for marking (FIG. 4E), done in a series of single loops at high speed (500 mm s−1) and high power (20 W), to both compensate for the loss in energy in the reflection and minimize thermal deformation of the reflector. Finally, the part was folded 45° upward, allowing the possibility of further assembly (FIG. 4F). A close up of the final marked surface is shown in FIG. 4G.

These experiments demonstrate using a tabletop marking laser to create complicated 3D structures out of thin metal sheets. Starting with blank, unpatterned sheeting, laser cutting, and forming is used to cut and assemble parts containing both upward and downward folds without manual handling. Laser forming is also used to precisely align two components, demonstrating the positioning of an optical reflector to guide the laser and pattern a portion of the sheeting originally inaccessible on the underside. At this price point, these processes will enhance the small scale metal fabrication capabilities for a wide range of researchers, educators, and small businesses.

Substrate Materials

Any number of materials and material thicknesses can be used in this methodology, as guided for example by thermal modeling. Different lasers, laser powers or spot sizes can be selected based on the material and the thickness, as guided for example by thermal modeling. It is believed that thicknesses as high a 1 cm or above can be folded. In embodiments, the substrate is 5 mm or less in thickness, or 2 mm or less, or 1 nm or less, or 500 microns (μm) or less.

Exemplary materials include nickel, nickel.titanium, copper, various steel alloys including stainless steel, titanium, aluminum, iron/aluminum alloy, copper alloys like brass and bronze, and the like. Exemplary materials further include crystalline materials such as silicon, borosilicate glass, alumina ($Al_2O_3$) ceramic, and the like.

Fold Angles

In embodiments of the invention, high fold angles are achieved with closely spaced lines of laser heating. For example, TGM folds in excess of 90° using a vertically aligned laser can be achieved with two or more such lines (and two releasable segments). Or, BM folds of in excess of 120° can be achieved. All folding of metal tend to have an element of curvature. Those of skill in metal working will recognize when the material is bent at an angle substantially between two planes, and when there is a more sustained curvature. This same knowledge is applicable to non-metallic substrates.

Laser Control

The invention can provide great flexibility with a laser oriented orthogonal to the plane of the substrate. The laser can be operated in multiple locations in 3D space, and with multiple orientations utilizing for example computer numerical control (CNC) mechanisms.

Reel-to-Reel Machines, Incorporated Deposition

For any kind of meaningful production, however, there is a significant disadvantage of having to manually place and clamp in metal sheeting for production. This manual transfer of substrates, what is known as batch or sheet processing, is however standard in most self-folding manufacturing, and is a major reason why it has remained primarily in the laboratory.

In the printing industry, it is common to use continuous feedstock transferred through a series of processing steps as it transfers between two rolls of flexible material, what is known as roll-to-roll (or reel-to-reel) processing. This technique removes the need for substrate transfer. In this disclosure, the use of a roll-to-roll type process for laser-implemented fabrication. Substrate sheeting is transferred from one roll to a fixed height using a guide that defines a manufacturing position. The substrate located in the manufacturing position can be subjected to laser-implemented fabrication. After the manufacture, the residual substrate can be transferred to a second roll and another blank region of substrate moved into the manufacturing position.

FIG. 6 illustrates an exemplary reel-to-reel device 20. Reel 22 supplies substrate 24 to manufacturing position 28. Guide 26 keeps the substrate flat in the manufacturing position. The guide can have a through slot through which the substrate arrives, and slot to both sides. The guide can be of a lubricious polymer such as polytetrafluoroethylene or the line. In embodiments, there is a through slot through which the substrate leaves the manufacturing position. The substrate is taken up by second reel 30. In the illustration, there is a reel guide 32. Motor 34 pulls the substrate through the manufacturing zone. The motor can be for example various DC or AC motors, such as a brushless DC motor, a high resolution stepper motor, a high resolution servo motor, or the like.

In the manufacturing process the flexible foils are transferred between the two rollers through the guide, which sets the height. In the manufacturing zone the laser (above, not shown) is used to cut and fold 3D components.

A roll-to-roll laser cutter configured for rapidly creating 3D parts is an important new innovation allowing self-folding origami to be done at a large scale.

FIG. 7 shows schematically another reel-to-reel device 120. The numbering of the reel-to-reel device elements largely matches the numbering in FIG. 6, but advanced by a value of one hundred. The additional elements are a second manufacturing guide 136, a second manufacturing zone 138, material deposition device (such as a 3D printer head 139), and a laser 140. The manufacturing guides can be such that enough of the top surface of the substrate 124 is unobstructed when the substrate moves from the first manufacturing zone 136 to the second 138. In embodiments, there is a second motor 144 so that the substrate can be moved between the two manufacturing zones as different elements of the fabrication are effected. With such a device incorporating deposition of additional elements (such as 3D printing), additional elements can be associated by deposition with the construct of the laser-implemented fabrication. A material deposition device can for example add material by welding, gluing or adhering, using a physical attachment device such as a bolt, rivet, or the like, 3D printing, or other deposition/attachment means. Robotic elements and controls can be incorporated in to the material deposition device.

Misc.

Reference to "downward" folds means folds away from the laser, and "upward" folds are towards the laser. Recitations of "above" and "below" are relative to setting the frame of reference with the laser being "above" the substrate. It will be recognized that the apparatus can be set in different orientations such with the substrate being horizontal, or the laser being inverted, yet the relative orientation of the laser is still "above" the substrate. Thus, "downward," "above," and "below" are relative designations with respect to the laser, and not literal designations.

All ranges recited herein include ranges therebetween, and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4 or more, or 3.1 or more. If there are two ranges mentioned, such as about 1 to 10 and about 2 to 5, those of skill will recognize that the implied ranges of 1 to 5 and 2 to 10 are within the invention.

Where a sentence states that its subject is found in embodiments, or in certain embodiments, or in the like, it is applicable to any embodiment in which the subject matter can be logically applied.

This invention described herein is of a laser-driven manufacturing method and related machines. Although some embodiments have been discussed above, other implementations and applications are also within the scope of the following claims. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims. More specifically, those of skill will recognize that any embodiment described herein that those of skill would recognize could advantageously have a sub-feature of another embodiment, is described as having that sub-feature Publications and references, including but not limited to patents and patent applications, cited in this specification are herein incorporated by reference in their entirety in the entire portion cited as if each individual publication or reference were specifically and individually indicated to be incorporated by reference herein as being fully set forth. Any patent application to which this application claims priority is also incorporated by reference herein in the manner described above for publications and references.

REFERENCE NUMERALS ARL 17-40

10 other structures
12 seam
14 line
20 reel-to-reel device
22 reel
24 substrate
26 guide
28 manufacturing position
30 second reel
32 reel guide
34 motor
122 reel
126 guide
130 second reel
136 second manufacturing guide
138 second manufacturing zone
140 laser

What is claimed is:

1. A method of cutting and folding a substrate that defines a plane with a focused laser beam, directed from a direction to the substrate, to form a three-dimensional (3D) element with features in 3-dimensions, the method comprising:
    (a) executing from said direction laser cuts to the substrate, which is initially unpatterned and planar, so as to provide one or more releasable segments; and
    (b) executing one or more folds to form the 3D element by performing:
        (i) from said direction one or more laser-executed upward folds to bend at least one releasable segment of the one or more releasable segments; and
        (ii) from said direction one or more laser-executed downward folds to bend at least one releasable segment of the one or more releasable segments;
    wherein the cuts and folds are structured so that precursors to the 3D element remain attached to the substrate while sufficient cuts and folds are made to form the 3D element; wherein the substrate is immobile during said steps (a) through (b), or is only moved in the plane of the substrate; and
    wherein the method further comprises:
        forming a reflector from the substrate; and
        re-directing the focused laser beam using the reflector to cut, etch or fold at least one of the one or more releasable segments that would otherwise be inaccessible to the focused laser beam from said direction.

2. The method of claim 1, wherein the one or more of the folds comprises an upward or a downward fold in excess of 90° measured from a plane of the substrate which the at least one releasable segment being bent initially lies before said upward or downward fold.

3. The method of claim 2, wherein the one or more of the folds comprises an upward fold in excess of 90° measured from the plane of the substrate which the at least one releasable segment being bent initially lies before said upward fold.

4. The method of claim 2, wherein the one or more of the folds comprises a downward fold in excess of 120° measured from the plane of the substrate which the at least one releasable segment being bent initially lies before said downward fold.

5. The method of claim 1, further comprising impinging the focused laser beam orthogonal to the plane of the substrate.

6. The method of claim 1, wherein the substrate is conditioned to favor bending along at least one axis.

7. The method of claim 1, wherein the substrate is conditioned to favor bending along at least two axes.

8. The method of claim 1, further comprising providing the substrate to a fabrication zone from a roller.

9. The method of claim 1, further comprising holding the substrate immobile during said steps (a) through (b).

10. The method of claim 1, wherein one or more substrate regions, distinct from the one or more releasable segments, are laser folded such that their edges adjacent to the one or more releasable segments are above or below the plane, thereby removing the one or more substrate regions from interfering in the formation of the 3D element.

11. The method of claim 10, wherein one or more said edges are below the plane.

12. The method of claim 1, wherein both steps (b)(i) and (b)(ii) are executed.

13. The method of claim 1, wherein the one or more folds comprise permanent plastic deformation of the material.

14. The method of claim 1, using a single laser to execute the laser cuts and laser-executed folds.

15. The method of claim 1, using a single laser to execute from above the one or more upward folds and the one or more downward folds.

16. The method of claim 15, using the single laser to execute the one or more upward folds via a temperature gradient mechanism of the substrate material and the one or more downward folds via a buckling mechanisms of the substrate material.

17. The method of claim 1, wherein forming the reflector comprising: cutting and folding a portion of the substrate.

18. The method of claim 17, wherein the reflector comprises one of the one or more releasable segments.

19. The method of claim 1, wherein the reflector is incorporated into and remains a part of the 3D element once formed.

20. A method of cutting and folding a substrate that defines a plane with a focused laser beam, directed from above the substrate, to form a three-dimensional (3D) element with features in 3-dimensions, the method comprising:
(A) providing:
a first reel configured for dispensing the substrate;
a second reel configured for receiving the substrate;
a guide element for providing a flat area of the substrate between the first and second reels; and
the focused laser beam configured to strike the substrate in the flat area;
(B) executing from above laser cuts to the substrate, which is initially unpatterned and planar, so as to provide one or more releasable segments; and
(C) executing one or more folds to form the 3D element by preforming one or more of:
(i) from above one or more laser-executed upward folds to bend at least one releasable segment of the one or more releasable segments; or
(ii) from above one or more laser-executed downward folds to bend at least one releasable segment of the one or more releasable segments,
wherein the cuts and folds are structured so that precursors to the 3D element remain attached to the substrate while sufficient cuts and folds are made to form the 3D element, and wherein the substrate is immobile during said steps (B) through (C), or is only moved in the plane of the substrate pursuant to the operation of the reels; and
wherein the method further comprises:
cutting and folding a portion of the substrate to form a reflector; and
re-directing the focused laser beam using the reflector to cut, etch or fold at least one of the one or more releasable segments that would otherwise be inaccessible to the focused laser beam from above.

21. The method of claim 20, further comprising depositing material on the 3D element formed.

22. The method of claim 20, further comprising operating a 3D printer configured to deposit material on the 3D element formed.

23. The method of claim 21, wherein depositing material comprises welding.

24. The method of claim 19, wherein the reflector is positioned at a first position for re-directing the focused laser beam, and at a second position in the 3D element once formed.

* * * * *